United States Patent
Kuroda

(10) Patent No.: US 7,825,628 B2
(45) Date of Patent: Nov. 2, 2010

(54) DEVICE FOR BALANCING CELL VOLTAGE FOR A SECONDARY BATTERY

(75) Inventor: Shinsaku Kuroda, Kyoto (JP)

(73) Assignee: GS Yuasa Corporation, Kyoto-shi (JP)

( * ) Notice: Subject to any disclaimer, the term of this patent is extended or adjusted under 35 U.S.C. 154(b) by 711 days.

(21) Appl. No.: 11/753,882

(22) Filed: May 25, 2007

(65) Prior Publication Data

US 2007/0285058 A1    Dec. 13, 2007

(30) Foreign Application Priority Data

May 27, 2006    (JP)    ............................. 2006-147503

(51) Int. Cl.
*H02J 7/00* (2006.01)
*G01N 27/416* (2006.01)
*H01M 6/16* (2006.01)

(52) U.S. Cl. ........................ 320/116; 320/118; 320/124; 324/426; 429/320

(58) Field of Classification Search .................. 320/116
See application file for complete search history.

(56) References Cited

U.S. PATENT DOCUMENTS

| 7,609,030 | B2 * | 10/2009 | Uesugi et al. | 320/118 |
| 2002/0190692 | A1 * | 12/2002 | Marten | 320/116 |
| 2003/0044689 | A1 * | 3/2003 | Miyazaki et al. | 429/320 |
| 2004/0036446 | A1 * | 2/2004 | Iwashima | 320/116 |
| 2004/0178768 | A1 * | 9/2004 | Miyazaki et al. | 320/116 |
| 2005/0212481 | A1 * | 9/2005 | Nakada | 320/116 |
| 2005/0242775 | A1 * | 11/2005 | Miyazaki et al. | 320/116 |

FOREIGN PATENT DOCUMENTS

JP    2001-268817 A    9/2001

* cited by examiner

*Primary Examiner*—Edward Tso
*Assistant Examiner*—Yalkew Fantu
(74) *Attorney, Agent, or Firm*—Westerman, Hattori, Daniels & Adrian, LLP

(57) ABSTRACT

The present invention is a method for balancing voltages of a serially connected plurality of cells in a battery pack provided with the plurality of cells. In this method, the voltages are balanced by: connecting a pair of a resistor and a switch, which are serially connected with each other, in a parallel relationship to one of the plurality of cells; switching the switch from an open state to a closed state when a voltage of the one cell increases to a prescribed balance operation starting voltage; and maintaining a state where the cell is charged by a voltage of the same magnitude as a voltage that is applied to both ends of the pair after switching of the switch to the closed state.

11 Claims, 3 Drawing Sheets (a) (b)

(c)

DEVICE FOR BALANCING CELL VOLTAGE FOR A SECONDARY BATTERY

BACKGROUND OF THE INVENTION

1. Field of the Invention

The present invention relates to a cell voltage balancer with the aim of equalizing voltages of a plurality of cells configuring a battery pack.

2. Description of the Related Art

A plurality of cells (here, a cell means a chargeable secondary battery) are serially connected to configure a battery pack. Even when such a battery pack is charged, the cells therein may vary in voltage. This is caused by a difference in degree of progress of charge among the cells even when the battery pack is charged at a constant current due to the presence of variations in value of internal resistance and the like among the cells. A device for eliminating the variations in cell voltage as thus described is generally called a "cell voltage balancer".

A circuit is loaded on the cell voltage balancer. A configuration of the circuit is under studies from a variety of aspects. For example, there is a cell voltage balancer where a pair of a resistor and a switch that are serially connected with each other is parallelly connected with each cell (Japanese Patent Application Laid-Open No. H10-050352). The pairs of the resistor and the switch are, for example, controlled in the following manner so as to equalize voltages of the cells.

(1) When a voltage of a cell reaches a charge target voltage, a switch concerning the cell is switched to a closed state, to bypass a charging current through the pair of the resistor and the switch. Thereby, the cell is discharged so that voltages of the cells are equalized.

(2) When variations in voltage among the cells are large, a switch concerning a cell with a high voltage is switched to the closed state, thus to bypass the charging current through the pair of the resistor and the switch. Thereby, the cell is discharged so that the voltages of the cells are equalized.

(3) A microprocessor constantly monitors a charging state of each cell from information on measurements of a voltage, a current and the like of each cell to finely control opening/closing of the switch, so as to prevent large variations in voltage of the cells. Thereby, the voltages of the cells are highly accurately equalized.

BRIEF SUMMARY OF THE INVENTION

However, in the case of using the above technique (1), there has been a problem in that the cell voltage exceeds the charge target voltage even though the switch is switched from the open state to the closed state. This occurs because a charging reaction may proceed inside the cell even though the switch is switched to the closed state. Further, also in the case of using the above technique (2), there has been a problem in that the same condition as the above takes place if a voltage is close to the charge target voltage when the variations are large. When the cell voltage exceeds the charge target voltage, a process of re-discharging that cell alone needs to be performed, which is highly complicated.

Further, since a large current flows in a resistor that releases a charging current or a discharging current of a cell, a resistor capable of resisting such a large current needs to be used. This also applies to a switch. Under such circumstances, there has been a problem of upsizing the cell voltage balancer. Further, there has also been a problem of having to release heat generated by the resistor.

Moreover, in the case of the above technique (3), there has been a problem of increasing costs for development and production of the balancer for securing high reliability in terms of both hardware and software. Furthermore, there has also been a problem of not being able to use the above technique (3) in the first place depending upon applications since the use of a complicated component such as a microprocessor is restricted in applications where extremely high reliability is required (e.g. application for aircraft).

The present invention was made to solve the above problems. Namely, it is an object of the present invention to provide a "cell voltage balancer" capable of highly accurately equalizing cell voltages while avoiding complication, as well as upsizing, of the balancer.

(1) The present invention is a method for balancing voltages of a serially connected plurality of cells in a battery pack provided with the plurality of cells. In this method, the voltages are balanced by: connecting a pair of a resistor and a switch, which are serially connected with each other, in a parallel relationship to one of the plurality of cells; switching the switch from an open state to a closed state when a voltage of the one cell increases to a prescribed balance operation starting voltage; and maintaining a state where the cell is charged by a voltage of the same magnitude as a voltage that is applied to both ends of the pair after switching of the switch to the closed state.

Further, the present invention is a cell voltage balancer for balancing voltages of a serially connected plurality of cells in a battery pack provided with the plurality of cells, including: a resistor, parallelly connected with one of the plurality of cells; and a switch, which is parallelly connected with the one of the plurality of cells while serially connected with the resistor, and is switched from an open state to a closed state when a voltage of the one cell increases to a prescribed balance operation starting voltage, characterized in that a resistance value of the resistor is a value at which a current capable of contributing charge of the cell parallelly connected with the resistor flows when the switch serially connected with the resistor comes into a closed state.

It is preferable to take a look at a circuit configuration in order to understand the present invention. Although merely one of specific modes of the present invention, a circuit configuration is shown in FIG. 1. In understanding the present invention, it is necessary to focus attention on differences of the resistance value of the resistor in the circuit of the present invention and a method for controlling the circuit in the present invention from those of a conventional art even if the same configuration as that of the circuit of the present invention was disclosed in the conventional art. Namely, the present invention is characterized in that, after switching of the switch to the closed state, by a voltage of the same magnitude as a voltage that is applied to both ends of the resistor and the switch (hereinafter these are simply referred to as a "pair" in the specification), a cell parallelly connected with the pair is kept being charged (i.e. float charge is performed).

The resistance value of the resistor is set to a prescribed value. In the present invention, the prescribed value is a value at which a current capable of contributing charge of the cell parallelly connected with the resistor when the switch serially connected with the resistor comes into the closed state. For obtaining such a value, the resistance value may be set to a value larger to some extent than an internal resistance of the cell. Although such a value can be determined as appropriate by the skilled in the art, for example, the resistance value of the resistor may be 75 ohms when the internal resistance of the cell is approximately 0.3 milliohms. Further, it is of importance that the resistance values of the resistors respectively connected to the cells be made identical.

Thereby, in the present invention, after switching of the switch to the closed state, the cell is kept being charged by a voltage of the same magnitude as a voltage that is applied to each side of the pair, and so-called float charge is performed. Namely, the cells are not charged for a short time after switching of the switch to the closed state.

In the above-mentioned manner, the cells are uniformly charged by partial pressure of a voltage that is applied from a charging power source.

For the resistor and the switch themselves as elements configuring the present invention, components known by the skilled in the art may be used as appropriate. Examples of the switch usable may include a MOSFET transistor, a bipolar transistor, or a mechanical relay. It is to be noted that a secondary cell such as a lithium ion battery or a nicad battery is used as a cell to be connected to the cell voltage balancer of the present invention and charged.

The balance operation starting voltage according to the present invention is described. A value of the balance operation starting voltage is lower to some extent than that of a voltage as an ultimate target in charging (hereinafter referred to as "charge target voltage"). Although the degree of how much lower is appropriately determined sufficiently by the skilled in the art who implements this invention, generally, the balance operation starting voltage may be approximately 90 to 98% of the value of the charge target voltage.

The reason for this is as follows. Since a chemical reaction continues inside the cell even when the charging current is made sufficiently small, the cell voltage does not immediately stop increasing and may undesirably increases. Therefore, it is too late if the switch is switched from the open state to the closed state at the time when the cell voltage reaches the charge target voltage, which may give rise to a problem of the cell voltage exceeding the charge target voltage. Accordingly, switching the switch from the open state to the closed state at the time when the cell voltage reaches the balance operation starting voltage which is lower than the charge target voltage exerts the effect of avoiding the above-mentioned problem.

Next, the operation of equalizing voltages of the cells in the present invention is described.

From the viewpoint of operation of balancing voltages of the cells, a voltage of a cell after reaching the balance operation starting voltage increases at a decreased rate whereas a voltage of a cell that has not reached the balance operation starting voltage still increases at a high rate. Therefore, a voltage difference between those cells rapidly narrows. Then, in a state where the switches related to the cells have all been switched from the open state to the closed state and the cells are all close to the charge target voltage, each of the cells is charged by a voltage generated at both ends of the pair.

A study is made on the voltage that is applied to both ends of the pair and the voltage that is applied to the cell when charge proceeds in the above-mentioned state. The internal resistances of the cells have influences on voltages thereof. However, in a state where the voltage of the cell is close to the charge target voltage, the charging current flowing in the cell is small. Since this reduces the influence exerted by the internal resistance of the cell on the resistance of a set of parallel connection between the pair and the cell, in reality, the voltage that is applied to the cell is determined by a resistance value of the resistor configuring the pair. Therefore, so long as the resistance values of the resistors among the cells are made uniform, the voltages that are applied to the respective cells for charge (voltages at both ends of the pairs) become uniform even if there are some variations in internal resistance of the cells. Therefore, the effect of highly accurately equalizing variations in voltage of the cells to be charged is exerted.

Namely, while selecting appropriate circuit components, the method for controlling the circuit components is made different from the conventional method so that variations in voltage of cells can be highly accurately suppressed.

In addition, it goes without saying that making the magnitudes of resistance values of the resistors configuring the pairs is easier than making the magnitudes of the internal resistances of secondary batteries such as lithium ion batteries which configure the battery pack.

(2) The present invention is a cell voltage balancer for a secondary battery, which parallelly connects a pair of a resistor and a switch with each of a plurality of cells in a battery pack configured by serially connecting the cells, and opens or closes the switch, to equalize voltages of the cells, characterized in that each of the cells is provided with a switching circuit for switching the switch parallelly connected with the cell from an open state to a closed state with the increase in voltage of the cell to a balance operation starting voltage set at a voltage value lower than that of a charge target voltage, and each of all of the plurality of cells is configured to be kept in a state of being charged by a voltage generated at both ends of the pair of the resistor and the switch after the parallelly connected switches has been switched from the open state to the closed state.

Thereby, the effect of the cells being uniformly charged by partial pressures of voltages that are applied during charge is exerted.

(3) In addition to the configuration of (2) above, the present invention is characterized in that the resistor is configured to be set to a voltage value at which a current, capable of contributing charge of the cell parallelly connected with the pair of the resistor and the switch, flows even in the cell when the switch paired with the resonator comes into the closed state.

In this invention, the resistance value at which the current is capable of contributing charge of the cell can be determined according to characteristics of a battery pack connected to the cell voltage balancer of the present invention. For example, in the case of a battery pack configured by a lithium ion battery for aircraft as described later, its resistance value may be set to approximately 75 ohms.

With this invention, a state is kept where the charging current flows in the cell related to the switch having been switched from the open state to the closed state, and hence a current flowing to the pair decreases by the amount of the current flowing in the cell, thereby allowing reduction in sizes, as well as heat generation, of the resistor and the switch. This thus further simplifies the balancer.

(4) In addition to the configuration of (2) or (3) above, the present invention is characterized in that the switching circuit is provided with a comparison circuit for comparing a voltage of the cell with the balance operation voltage, and configured to switch opening/closing of the switch according to an output of the comparison circuit.

According to this, variations in voltage of the cells can be highly accurately suppressed in a control configuration only to switch opening/closing of the switch according to an output of the comparison circuit when variations in ON-resistance of the switches and discharging resistance of the cells are small.

Here, symbol $1a$ denotes a cell, numeral 2 denotes a charging power supply, symbol $3a$ denotes a resistor, symbol $3b$ denotes a switch, symbol $3c$ denotes a comparison circuit, numeral 3 denotes a cell voltage balancer, and symbol SC denotes a switching circuit.

DETAILED DESCRIPTION OF THE INVENTION

Embodiments of a cell voltage balancer of the present invention are described based upon drawings. Here described is a case where the cell voltage balancer is provided as part of a charger of a lithium ion battery as an example of a secondary battery.

Figure 1:
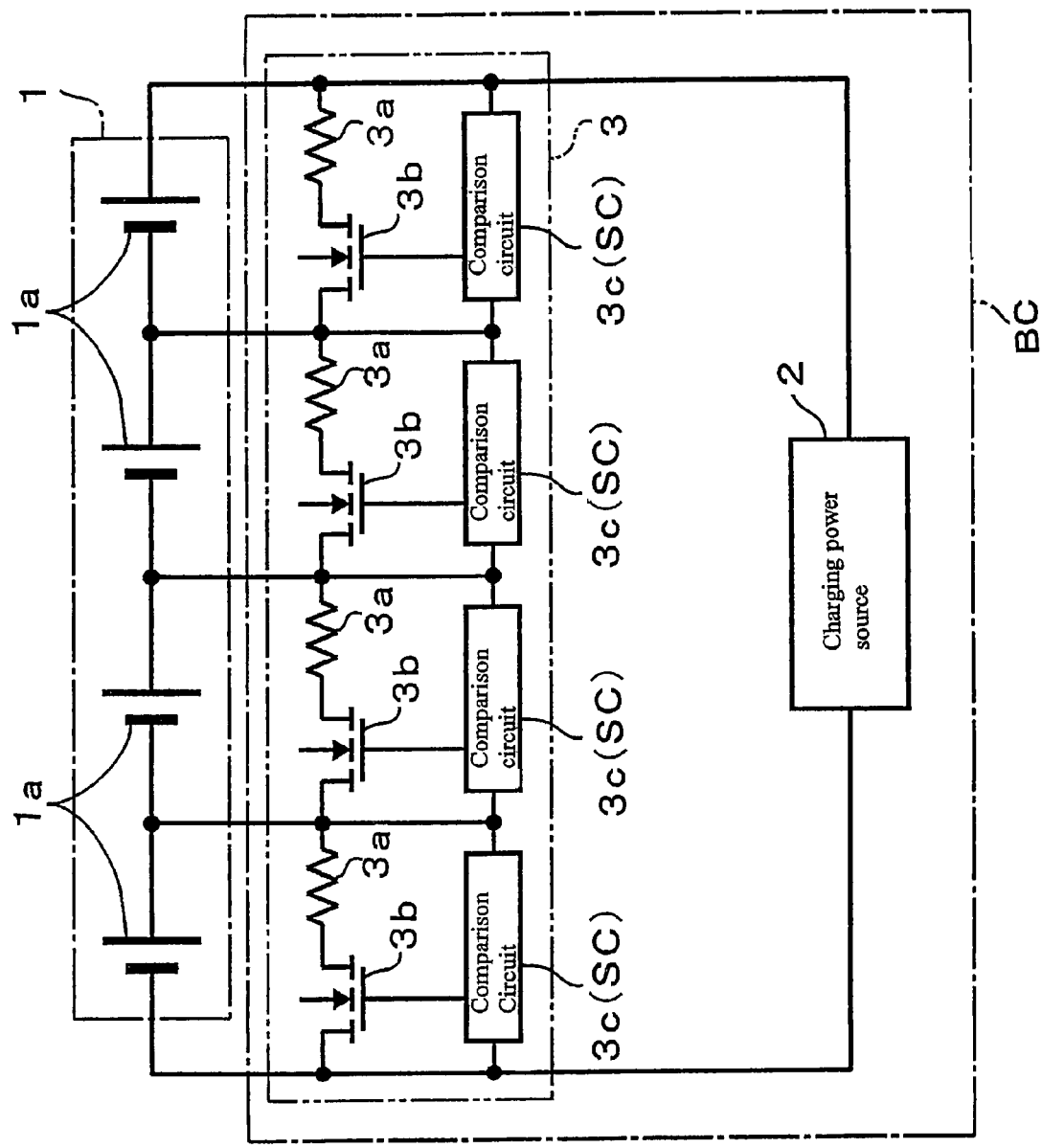
FIG. 1 is a schematic constitutional view of a charged circuit according to an embodiment of the present invention.

In the present embodiment, an object to be charged is a battery pack as in FIG. 1. The battery pack is configured by serially connecting cells $1a$. Since the cell $1a$ is a lithium ion battery, the battery pack as a whole is also a lithium ion battery. A charger BC for charging this lithium ion battery 1 includes a charging power source 2 for supplying the lithium ion battery 1 with a charging current and a cell voltage balancer 3.

Here assumed is a case where the charger BC of the present embodiment is installed on an aircraft along with the lithium ion battery 1. Therefore, the number of cells $1a$ configuring the lithium ion battery 1 is in reality larger than the number shown in FIG. 1, but a case where the number of cells $1a$ is four is described here for the sake of convenience.

The cell voltage balancer 3 includes a comparison circuit $3c$ and a pair of the resistor $3a$ and the switch $3b$, which are serially connected with each other, in relation to each of the cells $1a$. The switch $3b$ is configured by a MOSFET transistor. The pair of the resistor $3a$ and the switch $3b$ is parallelly connected with each of the cells $1a$. The comparison circuit $3c$ is connected so as to be inputted with a both-end voltage of each of the cells $1a$ and outputs to the switch $3b$ a signal to switch-control opening/closing of the switch $3b$. As thus descried, this switch $3b$ is opened/closed, to equalize voltages of the cells $1a$.

When the switch $3b$ is in the open state (OFF state), the charging current supplied from the charging power source 2 does not flow in the pair of the resistor $3a$ and the switch $3b$, but entirely flows on the cell $1a$ side. On the other hand, when the switch $3b$ comes into the closed state (ON state), the charging current supplied from the charging power source 2 also flows on the pair side, the pair being formed by the resistor $3a$ and the switch $3b$.

In a case where the switch $3b$ is in the closed state, when the resistor $3a$ with a small resistance value is in use, the cell $1a$ related thereto is discharged through the resistor $3a$ and the switch $3b$. However, in the present embodiment, a resistance value of the resistor $3a$ is set to a value (75 ohms) larger to some extent than the internal resistance (0.3 milliohms) of the cell $1a$. Thereby, when the switch $3b$ paired with the resistor $3a$ comes into the closed state, a current supplied from the charging power source 2 also flows in the cell $1a$ parallelly connected with the pair of the resistor $3a$ and the switch $3b$, which can contribute charging of the cell $1a$.

The comparison circuit $3c$ is provided as a switching circuit SC for shifting the switch $3b$ between the open state and the closed state. The comparison circuit $3c$ compares a voltage of the $1c$ with a voltage set as a balance operation starting voltage, and switches the switch $3b$ from the open state to the closed state when the voltage of the cell $1a$ exceeds the balance operation starting voltage. Thereafter, the comparison circuit $3c$ keeps the switch $3b$ in the closed state until receiving a release signal from the charging power source 2 side. Therefore, the comparison circuit $3c$ is configured by a comparator and a hold circuit for a comparison output. It is to be noted that the hold circuit is not required when a decrease in voltage of the cell $1a$ is small upon switching of the switch $3b$ to the closed state.

The balance operation starting voltage is set to a voltage smaller than a charge target voltage (e.g. 4.2 V) set as a voltage corresponding to full charge. Specifically, the value of the balance operation starting voltage is set to approximately 95 to 97% of the charge target voltage. Further, uniform resistance values are selected and used as resistance values of the resistors $3a$ and ON-resistances of the switches $3b$, the resistors $3a$ and the switches $3b$ being provided with respect to the respective cells $1a$.

Next described is operation of the cell voltage balancer in the case of charging the lithium ion battery 1 by the charging power source 2.

Even when the cells $1a$ configuring the lithium ion battery 1 are charged under the same conditions, the rates of progress of charge vary among the cells $1a$ due to variations in characteristic of the cells $1a$. The cell voltage balancer 3 operates to correct such variations so that any of the cells $1a$ is ultimately charged with accuracy by the charge target voltage (e.g. 4.2 V).

Figure 3:
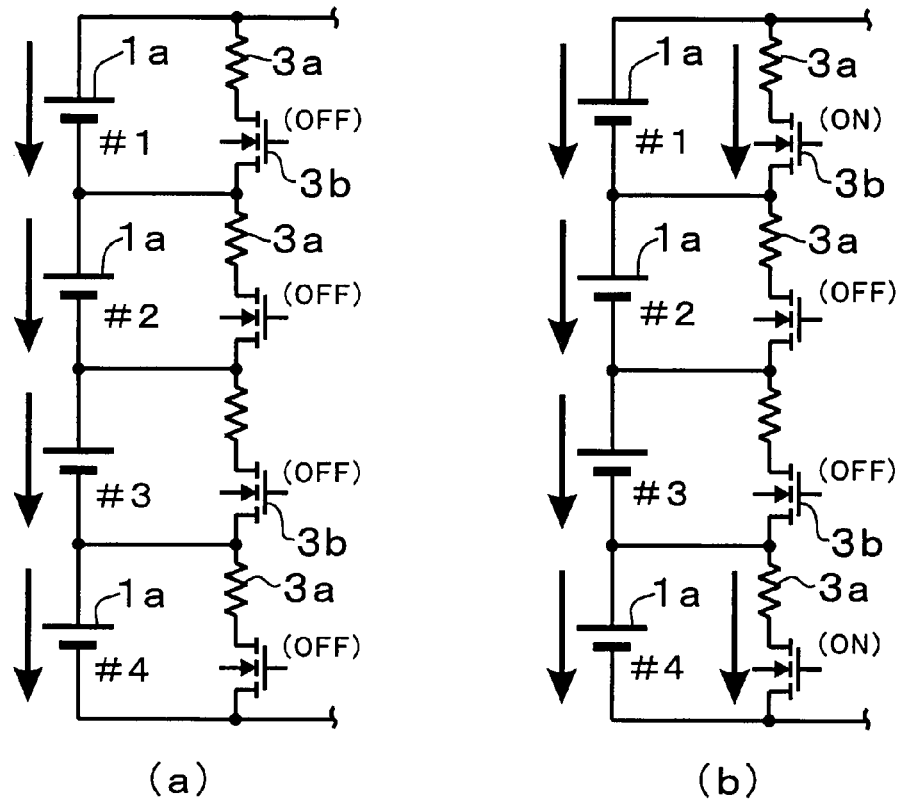
FIG. 3 is a view showing a change in operational state of a circuit along with the progress of charge according to the embodiment of the present invention.
Figure 3:
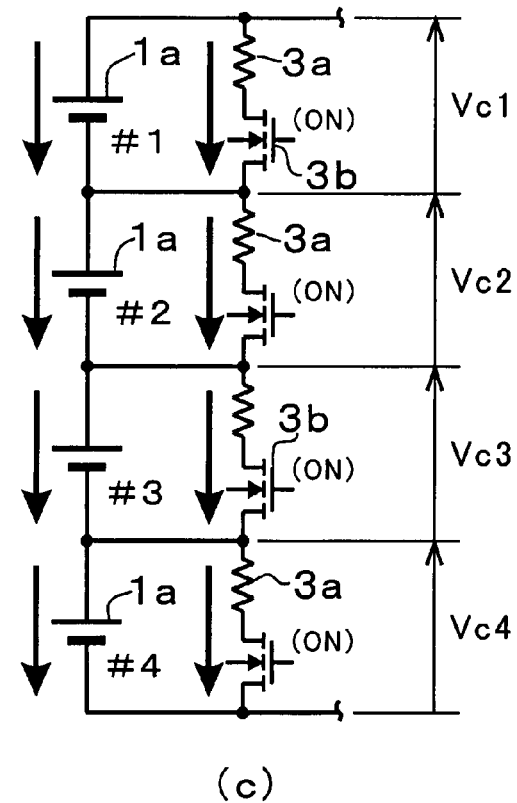

The process of charging control in response to the degree of progress of charge is described with reference to FIG. 3 showing the open/closed states to which the switch $3b$ are switched and whether or not the current is flowing. In FIG. 3, the open/closed states of the switch $3b$ are shown respectively as "(OFF)" (open state) or "(ON)" (closed state). Further, whether or not a pointer is provided by the side of the cell $1a$ or the resistor $3a$ and the switch $3b$ shows whether or not a current is flowing. It is to be noted that the respective cells $1a$ are numbered "#1" to "#4" so as to be distinguished for the sake of convenience of description.

In the initial stage of charge, as described above, the switches $3b$ are all in the open state (see FIG. 3A), and the charging current supplied from the charging power source 2 flows only on the serially connected cells $1a$ side. The cells $1a$ are charged by this charging current and voltages of the cells $1a$ increase, but due to variations in characteristic of the cells $1a$, the voltages of the cells $1a$ also vary.

Figure 2:
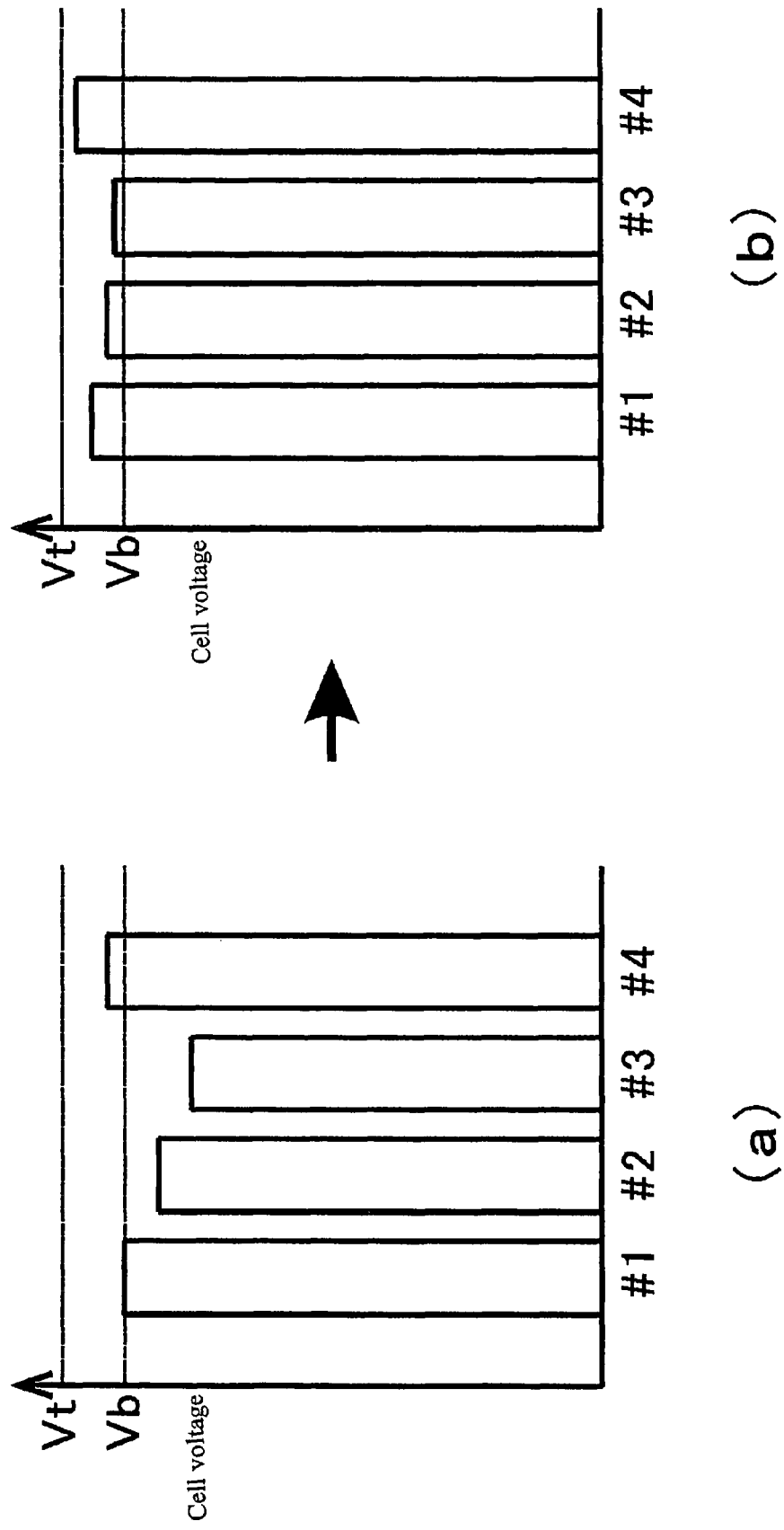
FIG. 2 is a view showing a change in voltage of each cell along with the progress of charge according to the embodiment of the present invention.

FIG. 2 shows variations in voltage of the cells $1a$, representing voltages of the cells $1a$ "#1" to "#4" in bar-chart form. In FIG. 2, symbol "Vt" denotes the charge target voltage, and symbol "Vb" denotes the balance operation starting voltage. When the charge proceeds to a state shown in FIG. 2A, voltages of the cells $1a$ "#1" and "#4" increase until reaching the balance operation starting voltage ("Vb"), and such an increase is accompanied by switching of the switches $3b$ related to the cells $1a$ from the open state to the closed state.

As in FIG. 3B showing the above-mentioned state, the charging current is divided to the cell $1a$ and the pair of the resistor $3a$ and the switch $3b$ as for the cells $1a$ "#1" and "#4", while the charging current entirely flows in the cells $1a$ as for the cells $1a$ "#2" and "#3". Hence, the rates of progress of charge decrease in the cells $1a$ "#1" and "#4", while the rates of progress of charge do not decrease in the cells $1a$ "#2" and "#3". Therefore, the cells 1a "#2" and "#3" where the progress of charge has been delayed gradually catch up with the cells 1a "#1" and "#4" where the progress of charge has been advanced.

In the cells 1a "#1" and "#4", the charging reaction may proceed owing to the charging state before switching of the switch 3b from the open state to the closed state, and the voltage may increase to a larger extent than the voltage that increases due to the charging current after switching of the switch 3b from the open state to the closed state. However, as described, the balance operation starting voltage has been set lower than the charge target voltage as described above, thereby causing no problem of the voltage increasing while far exceeding the charge target voltage.

In such a state, when the charge further proceeds and the voltages of the cells 1a "#2" and "#3" also exceed the balance operation starting voltage ("Vb") as shown in FIG. 2B, the switches 3b related to the cells 1a "#2" and "#3" are also switched from the open state to the closed state. As thus described, in all of the plurality of cells 1a configuring the lithium ion battery 1 as the battery pack, as shown in FIG. 3C, the charging current is divided to the cell 1a and the pair of the resistor 3a and the switch 3b after the point in time when the switch is switched to the closed state. In other words, a relationship is formed where each of the cells 1a is charged by a voltage generated at both ends of the pair of the resistor 3a and the switch 3b, to which the cell 1a is related, and that state is maintained.

At this point, the current flowing in the cell 1a side is on the decrease due to the progress of charge, and a proportion of the current flowing in the resistor 3a is on the increase. When the current flowing in the cell 1a is sufficiently small, a proportion of partial pressure applied to the cell is subjected to the proportion of the resistors 3a. Therefore, even when there are some variations in internal impedance among the cells 1a, the impedances of parallel connections each between the cell 1a and the pair of the resistor 3a and the switch 3b do not greatly vary. In FIG. 3C, voltages of the parallel connections shown with "Vc1" to "Vc4" (in other words, both-end voltages of the pairs of the resistors 3a and the switches 3b) are quite accurately uniform, and become even more uniform when the charge further proceeds. Accordingly, the cells 1a are charged by accurately uniformed voltages. Ultimately, the charging power source 2 side performs charging control so as to make "Vc1" to "Vc4" above become the charge target voltages. In the case of float charge, the above-mentioned state is maintained.

Finally, another embodiment of the present invention is described.

In the above-mentioned embodiment described was the case of maintaining the state where the charging current flows in the cell 1a related to the switch 3b when the switch 3b is switched from the open state to the closed state. However, when the voltages of the cells 1a increase to the balance operation starting voltage and the switches 3b are switched from the open state to the closed state, the cells 1a related to the switches 3b may be discharged, to rapidly adjust voltage balancing among the cells 1a.

In this case, the comparison circuit 3c is desirably set such that the balance operation starting voltage is lower than a balance operation stopping voltage for switching the switch 3b from the closed state to the open state. When the voltage of the cell 1a decreases to the balance operation stopping voltage due to discharge of the cell 1a or a change in impedance caused by opening/closing of the switch 3b, the switch 3b is switched from the closed state to the open state to resume charge. With the charge resumed, the voltage increases, and when it increases to the balance operation starting voltage, the switch 3b is again switched from the open state to the closed state. By performing such an operation, an increase in voltage of another cell 1a where progress of charge is delayed is waited.

It should be noted that this application is based upon the patent application (Japanese Patent Application 2006-147503) submitted to the Japanese Patent Office on May 27, 2006, and the contents are included here as reference.

The invention claimed is:

1. A device for balancing voltages of cells in a battery pack, comprising:
    cells serially connected;
    resistors, each of which is connected in parallel with each of the cells,
    switches, each of which is serially connected with each of the resistors,
    a charge power source connected to the cells, wherein the charge power source charges the cells, and
    a means for closing each of the switches when each of the cells reaches
    a prescribed balance operation starting voltage during charging the cells, wherein current for charging each of the cells flows through each of the resisters when each of the switches is closed,
    wherein each of the resistors has a resistance value larger than an internal resistance of each of the cells.

2. The device according to claim 1, wherein said balance operation starting voltage is lower than a charge target voltage.

3. The device according to claim 1, wherein resistance values of said resistors connected to said plurality of cells are an identical in magnitude.

4. The device according to claim 1, wherein the prescribed balance operation starting voltage is approximately 90 to 98% of the value of the charge target voltage of each of the cells.

5. A method for balancing voltages of a serially connected plurality of cells in a battery pack provided with said plurality of cells, comprising:
    providing cells serially connected;
    providing resistors, each of which is connected in parallel with each of the cells, wherein each of the resistors has a resistance value larger than an internal resistance of each of the cells,
    providing switches, each of which is serially connected with each of the resistors,
    providing a charge power source connected to the cells,
    charging the cells, and
    closing each of the switches when each of the cells reaches a prescribed balance operation starting voltage during charging the cells, wherein current for charging each of the cells substantially flows through each of the resisters when each of the switches is closed.

6. The method according to claim 5, wherein resistance values of said resistors connected to said plurality of cells are the same in magnitude.

7. The method according to claim 5, wherein the prescribed balance operation starting voltage is approximately 90 to 98% of the value of the charge target voltage of each of the cells.

8. A cell voltage balancer for a secondary battery, wherein cells are serially connected; wherein each of resistors is connected in parallel with each of the cells, each of the resistors having a resistance value larger than an internal resistance of each of the cells; wherein each of switches is serially connected with each of the resistors; wherein a charge power source is connected to the cells, wherein the charge power source charges the cells, the cell voltage balancer comprising:
a means for closing each of the switches when each of the cells reaches a prescribed balance operation starting voltage during charging the cells, wherein current for charging each of the cells substantially flows through each of the resisters when each of the switches is closed.

9. The cell voltage balancer for a secondary battery according to claim 8, wherein said resistor is configured to be set to a resistance value at which a current, capable of contributing charge of said cell parallelly connected with the pair of said resistor and said switch, flows even in said cell when said switch paired with said resonator comes into the closed state.

10. The cell voltage balancer for a secondary battery according to claim 8,
wherein said switching circuit is provided with a comparison circuit for comparing a voltage of said cell with said balance operation voltage, and configured to switch opening/closing of said switch according to an output of said comparison circuit.

11. The cell voltage balancer for a secondary battery according to claim 8, wherein the prescribed balance operation starting voltage is approximately 90 to 98% of the value of the charge target voltage of each of the cells.

* * * * *